F. M. KLOPF, DEC'D.
J. L. KLOPF, ADMINISTRATRIX.
SEPARABLE FASTENER.
APPLICATION FILED FEB. 9, 1918.
1,301,573.
Patented Apr. 22, 1919.
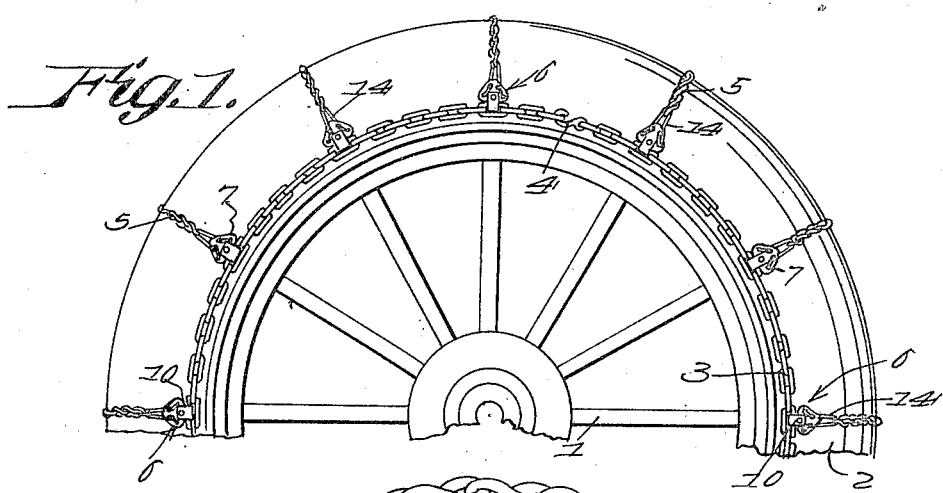
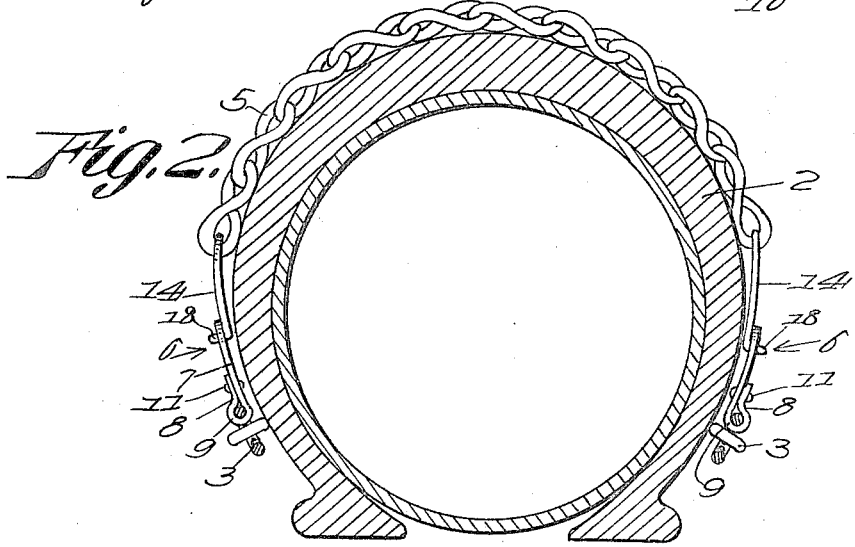
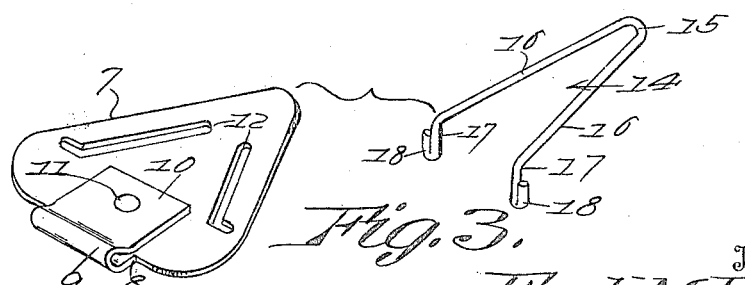
Inventor
Fred M. Klopf,
By
Attorney

UNITED STATES PATENT OFFICE.

FREDERICK M. KLOPF, OF NEWARK, NEW JERSEY, ASSIGNOR OF ONE-HALF TO JOSEPH H. LEHMAN, OF EAST ORANGE, NEW JERSEY; JESSIE L. KLOPF ADMINISTRATRIX OF SAID FREDRICK M. KLOPF, DECEASED.

SEPARABLE FASTENER.

1,301,573.     Specification of Letters Patent.     Patented Apr. 22, 1919.

Application filed February 9, 1918. Serial No. 216,237.

*To all whom it may concern:*

Be it known that I, FREDERICK M. KLOPF, a citizen of the United States of America, residing at Newark, in the county of Essex and State of New Jersey, have invented new and useful Improvements in Separable Fasteners, of which the following is a specication.

This invention comprehends generally improvements in that class of inventions known as buttons, buckles and clasps and more particularly relates to a separable fastener especially adapted for use in conjunction with an anti-skid chain for vehicle wheels.

It is the primary aim and object of the present invention to provide a device of the above mentioned character wherein the construction thereof is novel and permits of the cross chains being detachably connected to the side retaining chains, and enabling the user to quickly detach any of the cross chains when broken and replace another without necessitating the removal of the entire device from position on a pneumatic tire on a wheel.

More particularly, the present invention embraces the provision of a device of the above mentioned character wherein coöperative means is connected at opposite points on the side chains for detachably receiving the attaching member mounted on the adjacent ends of the cross chains.

Among the other aims and objects of this invention may be recited the provision of a device of the character described with a view to compactness, and in which the number of parts are few, the construction simple, the cost of production low and the efficiency high.

Other improvements and novel details in the construction and arrangement of the various parts of the apparatus will be brought out more in detail in the description to follow, which for a clear understanding of the invention should be considered in connection with the accompanying drawings, forming a part hereof, and wherein is disclosed for the purpose of illustration, a convenient and satisfactory embodiment of the invention. It is to be noted in this connection that minor changes in the construction and arrangement of parts may be made without departing from the principle of operation of the various parts.

The invention is clearly illustrated in the accompanying drawings, in which:—

Figure 1 is a side elevation showing the improved anti-skidding chain applied on a pneumatic tire on a vehicle wheel;

Fig. 2 is an enlarged transverse section taken through the tire showing one of the cross chains and the fastening means in elevation;

Fig. 3 is a perspective detail of the coöperative means for detachably connecting the cross chains with the side retaining chains.

Similar characters of reference are employed in all the above described views, to indicate corresponding parts.

Referring now, more particularly, to the accompanying drawings, there is illustrated a vehicle wheel 1 on which is mounted a pneumatic tire 2 of any conventional construction while disposed on the tire is the improved anti-skidding chain embodying generally side retaining chains 3 positioned on opposite sides of the tire near the felly and composed of a series of links. A detachable fastener 4 is inserted in one of the side chains 3 for facilitating the attaching of the anti-skidding chain. A plurality of cross chains 5 is now employed and embodies a series of connected links. These cross chains are detachably connected to opposite points of the side chains 3 through the instrumentality of the improved connection indicated in its entirety by the numeral 6.

In the present instance the improved connection may be said to consist of a plate 7 constructed desirably in a triangular form. A tongue 8 extends medially from the base portion of the plate and is rolled upon itself to form a sleeve 9 which is swingingly engaged about one side portion of the adjacent link of the side chain 3 while the chain terminates in a securing flange 10 which is secured to the body portion of the plate through the instrumentality of a suitable fastener such as a rivet 11. The plate is formed with a pair of spaced slots 12 positioned near the opposite sides and converging toward the vertex. The ends of the slots adjacent the base portion extend angularly from the main portions of the slot and project beyond but terminate short of the side edges of the plate forming, in effect, substantial insert openings for a purpose that will hereinafter become readily apparent. Detachably engaged with the end links of each chain 5 is an improved substantially resilient U-shaped attaching element indicated in its entirety by the numeral 14 and designed to coöperate with the adjacent plate. Each element is formed from a single piece of wire and consists of an intermediate portion 15 and spaced side arms 16. Outwardly and oppositely projecting hooks 17 are formed on the terminals of the arms 16 while oppositely projecting heads 18 are in turn formed on the terminals of the hooks. These heads 18 are designed to be passed through the angular portions 13 of the slots subsequent to slightly spreading the arms 16. These portions, in effect, serve as openings to consequently permit of the hook 17 engaging the opposed slots 12. It is apparent that when the U-shaped portion 15 of each of these elements is engaged in the adjacent end links of the cross chains and when the hooks 17 are engaged in the slots, upon the placing of the cross chains and the side chains in the proper position about the tire, as indicated in the drawings, any strain imparted to the cross chain will exert a pull on the attaching members and draw them toward the outer ends of the converging slots to assure of the retention of the attaching members against accidental displacement and consequently properly retaining the side chains in position. It is also appreciated, however, that owing to the construction of the attaching members and the position of the slots that the attaching members can be moved toward the inner ends of the slots and the heads passed through the angular portions 12 so as to be disconnected in the event that the cross chain is broken and in this manner enable the owner to readily replace any cross chain without necessitating the removal of the entire device.

It is believed that in view of the foregoing description, a further detailed description of the operation of the invention is entirely unnecessary. Likewise it is believed that the advantages of the invention will be readily apparent.

As many changes could be made in the above construction and many apparently widely different embodiments of this invention could be made without departing from the scope thereof and it is intended that all matter contained in the above description or shown in the accompanying drawings shall be interpreted as illustrative and not in a limited sense.

Having thus described the invention what is claimed as new and desired to be secured by Letters Patent is:—

1. A device of the character described consisting of an anchoring plate of a triangular configuration formed with spaced slots positioned near the sides of the plates and converging toward the vertex thereof, tongues projecting from the base portion of each plate and rolled to form a sleeve for swingingly connecting the plate, a securing flange formed on the terminal of the tongue and secured to the main portion of the plate, an attaching element formed from a single piece of resilient wire bent upon itself to provide side arms, hooks formed on the ends of the side arms for engagement in the slots in the plate, and oppositely projecting heads on the terminals of the hooks for preventing accidental disengagement of the arms.

2. A device of the character described consisting of an anchoring plate formed with spaced slots converging toward the outer end of the plate, the inner ends of the slots being extended angularly in opposite directions to form substantial insert openings, an attaching element formed from a single piece of resilient wire bent into a substantially U-shaped configuration and embodying an intermediate engaging portion, spaced side arms continuing from the intermediate portion, hooks on the terminals of the arms for detachable and slidable engagement with the slots in the plate, and oppositely projecting heads on the terminals of the hooks for removable insertion through the angularly projecting portions of the slots and designed for coöperating with the plate in preventing accidental disengagement of the hooks from the slots yet permitting of the disengagement of the hooks when desired.

In testimony whereof I affix my signature.

FRED M. KLOPF.

Copies of this patent may be obtained for five cents each, by addressing the "Commissioner of Patents, Washington, D. C."